United States Patent [19]

Sevald

[11] 3,983,858
[45] Oct. 5, 1976

[54] SECONDARY COMBUSTION CHAMBER SYSTEMS AND APPARATI FOR INTERNAL COMBUSTION ENGINES

[76] Inventor: William T. Sevald, 1400 Cedarhill Drive, Royal Oak, Mich. 48067

[22] Filed: Mar. 4, 1974

[21] Appl. No.: 447,843

Related U.S. Application Data

[63] Continuation of Ser. No. 341,677, March 15, 1973, abandoned.

[52] U.S. Cl. .......................... 123/191 R; 123/32 C; 123/32 K; 123/32 ST; 123/191 SP
[51] Int. Cl.² ........................................ F02B 19/16
[58] Field of Search............. 123/48 A, 32 A, 32 D, 123/32 C, 32 ST, 32 K, 32 SP, 191 S, 191 SP, 78 D, 78 AA, 78 B, 75 B, DIG. 4, 191 R, 37

[56] References Cited
UNITED STATES PATENTS

| | | | |
|---|---|---|---|
| 399,348 | 3/1889 | Richards | 123/32 SP |
| 1,406,877 | 2/1922 | Lemaire | 123/32 SP |
| 1,619,825 | 3/1927 | Lucke | 123/32 SP |
| 1,691,302 | 11/1928 | Peterson | 123/23 SP |
| 2,446,280 | 8/1948 | Hancock | 123/32 B |
| 2,511,992 | 6/1950 | Quick | 123/32 SP |
| 2,983,268 | 5/1961 | Heintz | 123/32 SP |

FOREIGN PATENTS OR APPLICATIONS

| | | | |
|---|---|---|---|
| 754,167 | 10/1953 | Germany | 123/32 ST |
| 590,168 | 3/1959 | Italy | 123/32 ST |

Primary Examiner—Charles J. Myhre
Assistant Examiner—William C. Anderson
Attorney, Agent, or Firm—William T. Sevald

[57] ABSTRACT

Systems and apparati for two-stage burning of the fuel mixture in an internal combustion engine having a wall forming secondary chamber with the engine head and including the intake valve and a primary chamber below the wall in the cylinder above the piston and including the spark plug; at least one port in the wall provides communication between the primary and secondary chambers to supply fuel mixture to the primary chamber from the secondary chamber, to transfer flame ignition from the primary chamber to the secondary chamber, and to transmit flaming expanding gasses from the secondary chamber to the primary chamber to augment pressure in the primary chamber to aid drive of the piston after the piston moves from crank dead-center condition. A relief may be provided in the wall and separated from the secondary chamber leading to the exhaust valve to provide an exit during the exhaust cycle. The several embodiments of the systems and apparati include charging and exhausting the primary chamber through the secondary chamber through one or more ports in the wall instead of a separate relief in the wall and also providing a relatively large port in the wall and a chamber valve carried by the piston adapted to occlude the port adjacent the top of the stroke of the piston and to clear the port at other positions of the piston. The spark plug ignites the fuel mixture in the primary chamber to provide first stage burning and the burning gasses in the primary chamber ignite the fuel mixture in the secondary chamber via the port in the wall to provide second stage burning.

10 Claims, 8 Drawing Figures

SECONDARY COMBUSTION CHAMBER SYSTEMS AND APPARATI FOR INTERNAL COMBUSTION ENGINES

This application is a continuation of patent application Ser. No. 341,677 filed Mar. 15, 1973 and now abandoned, for "Internal Combustion Engine Jet Flame Ignition Apparatus" filed by said William T. Sevald.

BACKGROUND OF THE INVENTION

Internal combustion engines have a combustion chamber in the cylinder of the block below the head and above the piston. The fuel mixture is valved into the chamber and ignited directly in the chamber by the spark plug. Only a portion of the fuel and additives are completely burned and this leaves carbon monoxides and portions of partially burned and unburned fuel and additives. This mixture of burned, partially burned, and unburned fuel and additives is exhausted from the engine. Two major results ensue: A, there is a loss of fuel and power; and B, there is pollution of the atmosphere.

The engine manufacturers provide for the excess of partially burned and unburned fuel in the design of the engine to cool the combustion chamber and spark plug to avoid carbonizing temperatures. The manufacturers then resort to compensating devices which aggravate the problem instead of solving it, such as after-burners, charcoal and other type reactors, scrubbers, filters, separators, etc. The engine manufacturers thus do not attempt to solve the problem directly by reducing the quantities of partially burned and unburned fuel and additives and the monoxides relative to pollution nor do they make any direct efforts toward conserving fuel by using less fuel and by burning substantially all the fuel used.

SUMMARY OF THE PRESENT INVENTION

With the foregoing in view, it is a primary object of the invention to solve the emissions problem of internal combustion engines directly by providing ignition systems and apparatus which burn the fuel and additives more efficiently and completely: A. To decrease loss of fuel and power; and B. To decrease the partially burned and unburned fuel and additives to reduce objectionable exhaust emissions.

It is a further object of the invention to more completely and efficiently extract the power potential from the fuel to reduce cost of operation and to conserve dwindling hydro-carbon fossil fuel supplies.

It is an object of the invention to supply the fuel mixture directly to the secondary chamber to scavenge it of residual combustion products to insure a richer, more readily combustible fuel mixture in the secondary chamber than in the primary chamber and to provide a cooling effect on the means forming the secondary chamber.

An object of the invention is to provide means forming at least one port leading between the primary and secondary chambers to supply fuel mixture from the secondary chamber to the primary chamber; to provide flame ignition from the spark-plug ignited fuel mixture in the primary chamber to the secondary chamber; to transmit the expanding, pressure-developing burning gasses from the secondary chamber to the primary chamber to augment the pressure in the primary chamber to augment drive against the piston; and to excite burning of the fuel mixture in the primary chamber with flame re-ignition from the secondary chamber.

An object of the invention is to provide first stage burning in the primary chamber of a portion of the fuel mixture during the initial slow enlargement of the primary chamber as the piston moves off dead-center crank position so that the entire fuel mixture is not trying to burn and expand during the initial slow enlargement of the primary chamber thereby providing the entire space of the slowly enlarging primary chamber for initially burning only a portion of the fuel mixture thereby providing increased space and better opportunity to burn for the portion of the fuel mixture in the primary chamber facilitating better and more complete burning.

An object of the invention is to proportion the quantity of fuel mixture available to burn to the volumetric capacity of the primary combustion chamber as it enlarges with downward movement of the piston in its power stroke by burning a portion of it initially in the primary chamber when the cylinder volume above the piston is relatively small and then subsequently burning the remainder of it in the secondary chamber and transferring the products of the remainder to the primary chamber above the piston when the cylinder volume above the piston is relatively larger with further downward movement of the piston.

An object of the invention is to burn an initial portion of the fuel mixture when the piston is adjacent crank dead-center of minimum mechanical advantage and to subsequently burn the remainder of the fuel mixture together with the initial portion when the piston is moving at and adjacent the crank 90° position of greatest mechanical advantage.

An object of the invention is to provide delayed ignition of the fuel mixture in the secondary chamber.

An object of the invention is to provide ignition of the fuel mixture in the secondary chamber from the flaming gasses of the fuel mixture in the primary chamber.

An object of the invention is to provide at least one port between the primary and secondary chambers to conduct ignition from the flaming gasses in the primary chamber combustion expansion pressure forcing flaming gasses through the port, by fuel mixture in the port conducting ignition, and/or by fuel mixture bleeding from the secondary chamber providing a fuse-like combustible column, singly and in combination.

An object of the invention is to provide a channel in the means forming the secondary chamber leading from the primary chamber directly to the exhaust valve of the engine.

An object of the invention is to provide channel means for exhausting one primary and/or secondary chamber directly to the exhaust valve and for indirectly exhausting the other chamber through the one chamber.

An object of the invention is to provide a port in the means forming the secondary chamber communicating between the chambers and a chamber valve on the piston adapted to enter and occlude the port when the piston lies in a position adjacent to and at top dead-center crank condition thereby blocking communication between the chambers in said positions and to clear the port allowing communication between the chambers when the piston lies in positions other than said positions.

An object of the invention is to provide a chamber valve on the piston and a matching occludable port in the means forming the secondary chamber for mechanically delaying ignition of the fuel mixture in the secondary chamber when the piston is adjacent top dead-center position of the crank with the valve lying in the port.

An object of the invention is to provide a valve carried by the piston for closing a port between the chambers at positions of the piston at and adjacent crank top dead-center position including modifications to the combinations shown and described such as isolating valve-port action to fuel intake, isolating valve-port action to combustion products exhaust, as well as the dual action shown and described and also including multiple valves and ports in combination.

These and other objects of the invention will become apparent by reference to the detailed description of the illustrated exemplary embodiments of the invention taken in connection with the accompanying drawings.

DETAILED DESCRIPTION OF THE ILLUSTRATED EMBODIMENTS

Figures 1, 2:
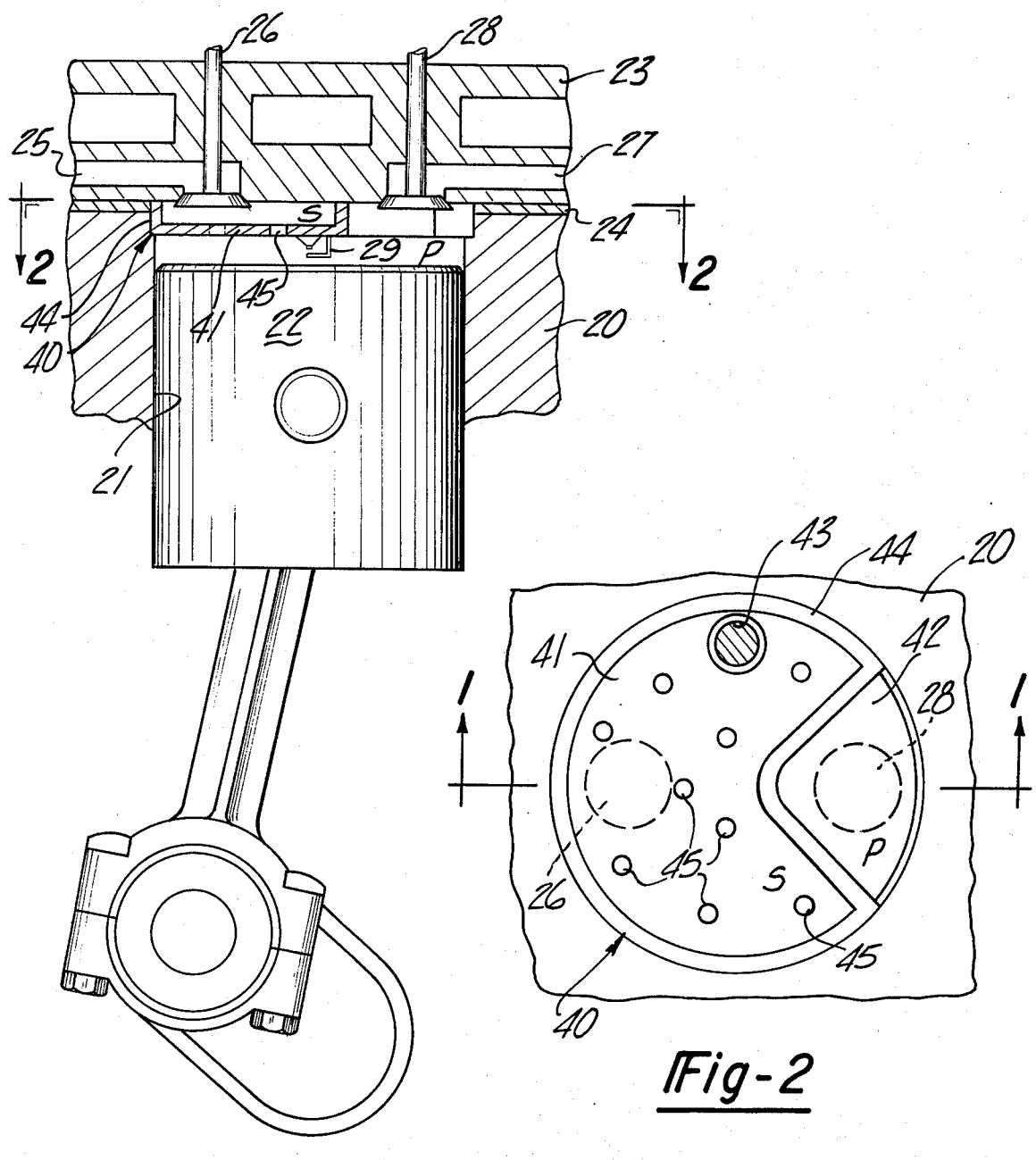
FIG. 1 is a vertical cross-sectional view of a valve-in-head engine block and head with portions broken away such as taken on the line 1—1 of FIG. 2, and showing the secondary combustion chamber formed by the apparatus communicating with the intake valve, the primary combustion chamber in communication with the exhaust valve through a relief in the apparatus, and ports in the apparatus providing communication between the primary and secondary chambers.
FIG. 2 is a top plan view of the structure seen at the line 2—2 of FIG. 1 with the head removed and indicating the intake and exhaust valves in broken lines.

Referring now to the drawings where like reference numerals refer to like and corresponding parts throughout the several views, the engine components diagrammatically illustrate in FIGS. 1 and 2 comprise a block 20, a cylinder 21 in the block 20, a piston 22 in the cylinder 21, a head 23 on the block 20 overlying the cylinder 21, a gasket or fillet 24 between the block 20 and the head 23, an intake manifold 25 leading to the cylinder 21, an intake valve 26 in the intake manifold 25, an exhaust manifold 27 leading from the cylinder 21, an exhaust valve 28 in the exhaust manifold 27, and a spark plug 29 in the head 23 with its ignition-end lying in the cylinder 21.

The secondary combustion chamber apparatus of FIGS. 1 and 2 comprise a case 40, a wall 41 on the case 40 lying over the cylinder 21 and spaced from the head 23. The wall 41 overlies the intake valve 26 and has a relief 42 so as not to overlie the exhaust valve 28. An aperture 43 in the wall 41 allows the spark plug 29 to extend past the wall 41 into the cylinder 21. An upstanding peripheral flange 44 on the wall 41 encompasses the space between the wall 41 and the head 23 at the relief 42 to separate the chambers from one another. The space enclosed by the head 23, wall 41, and flange 44 is the secondary combustion chamber S. The space in the cylinder 21 below the wall 41 and above the piston 22 comprises the primary combustion chamber P. Ports 45 in the wall 41 provide communication between the primary and secondary combustion chambers.

In operation, FIGS. 1 and 2, upon the exhaust stroke of the piston 22, the exhaust products of previous combustion exit through the relief 42 in the wall 41 to the open exhaust valve 28. Upon the suction stroke of the piston 22, fuel mixture is introduced through the open intake valve 26 into the secondary chamber S and through the ports 45 into the primary chamber P. Upon the compression stroke of the piston 22, the fuel mixture in the primary chamber P is compressed and this increase in pressure is communicated through the ports 45 to the secondary chamber S, compressing the fuel mixture in the secondary chamber S. Upon the power stroke of the piston 22, the spark plug 29 ignites the fuel mixture in the primary chamber P adjacent crank top dead-center with the piston 22 in its uppermost position and the fuel mixture starts to burn as the crank moves away from dead-center and the piston 22 moves downwardly enlarging the primary chamber P. At a crank position, such as between 20° to 60° off dead-center, the burning in the primary chamber P has intensified producing expanding gasses resulting in increased pressure. The ports 45 communicate ignition from the primary chamber P to the secondary chamber S and the fuel mixture in the secondary chamber S is ignited and burns with increasing intensity and expanding flaming gasses which are expelled through the ports 45 from the secondary chamber S into the primary chamber P to augment the pressure therein as the crank moves toward, through, and past its 90° position of greatest mechanical advantage.

Figure 3:
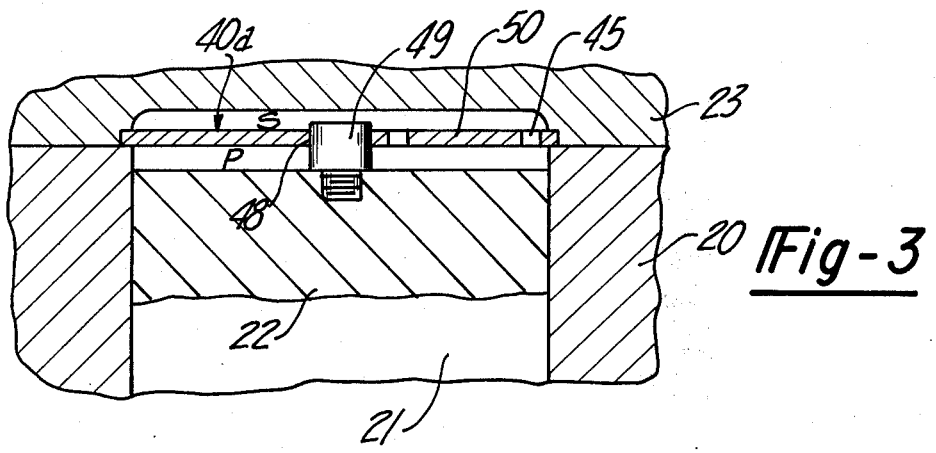
FIG. 3 is a cross-sectional view of a modification of the apparatus such as along the line 3—3 of FIG. 4 and similar to FIG. 1 with the valves deleted, showing small ports and a relatively larger port in the apparatus for communication between the chambers and a chamber valve carried by the piston for occluding the larger port adjacent the top of a piston stroke.
Figure 4:
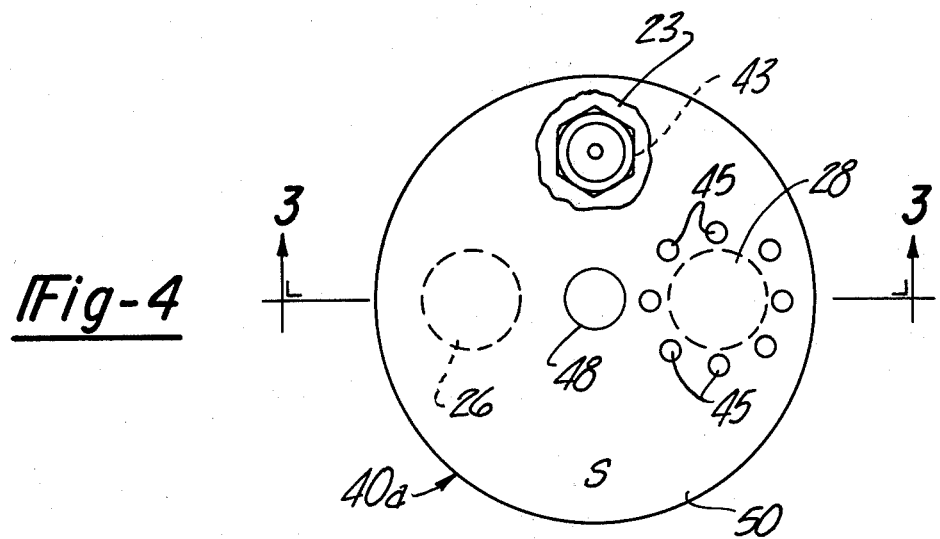
FIG. 4 is a top plan view of the apparatus seen in FIG. 3 with the head and block deleted and indicating the intake and exhaust valves in broken lines.

Referring to apparatus 40A of FIGS. 3 and 4, the wall 50 overlies the entire cylinder 21 and is equipped with a spark plug aperture 43, if needed, to locate the ignition end of the spark plug in the primary chamber P. The ports 45 are clustered at the exhaust valve 28 to provide quick exit of combustion products on the exhaust stroke of the piston. A chamber valve 49 is mounted on the piston 22 and a relatively large valve port 48 is provided in the wall 50 to receive the head of the chamber valve 49 therein in occluding relationship adjacent the top position of the piston 22 in the cylinder 21. On the intake stroke of the piston, the intake valve 26 supplies fresh fuel mixture to the secondary chamber S at a point in the chamber S remote from the ports 45 to scavenge the secondary chamber S into the primary chamber P and/or supplies the fuel mixture to the primary chamber P via the valve opening 48 in the absence of the valve 49. The apparatus of FIGS. 3 and 4 operates similarly to the operation of the apparatus of FIGS. 1 and 2 previously described. The apparatus 40A of FIGS. 3 and 4 illustrates two embodiments of the apparatus which may be used separately or in combination; i.e., the chamber valve and port and/or the clustered multiple ports.

Figure 5:
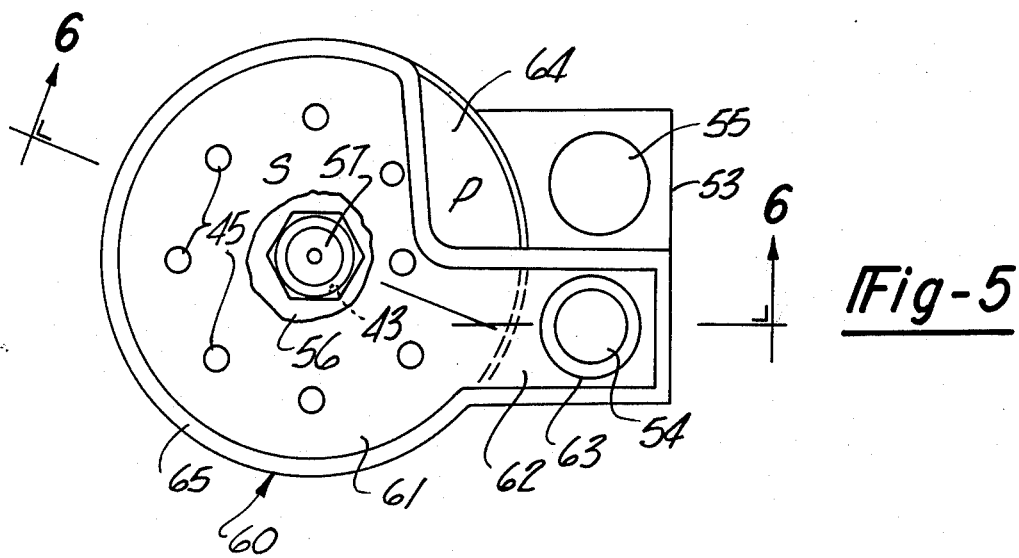
FIG. 5 is a top plan view of the apparatus on an L-type engine such as on the line 5—5 of FIG. 6 with the block and head deleted except for the intake and exhaust valves; and showing the secondary chamber in communication with the intake valve and the primary chamber in communication with the exhaust valve through a relief in the apparatus.
Figure 6:
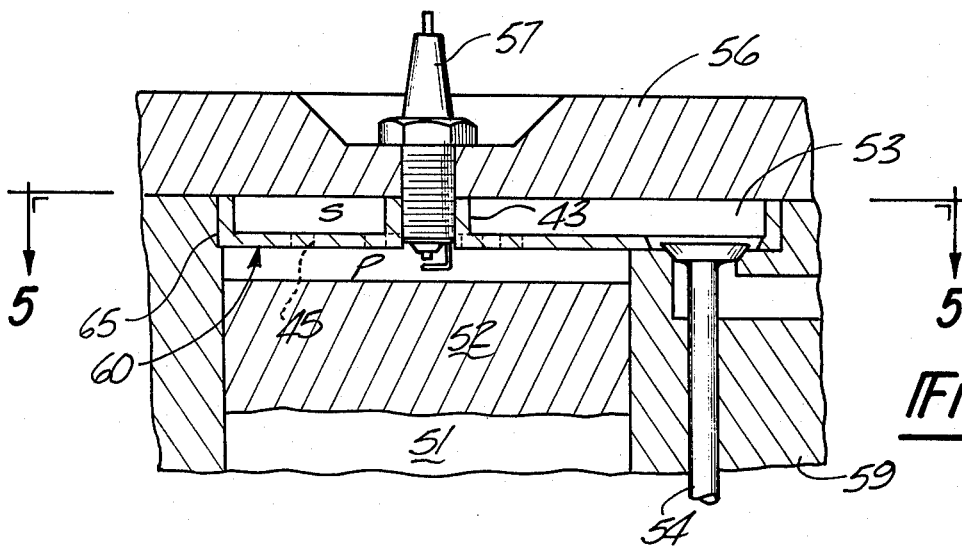
FIG. 6 is a vertical cross-sectional view of an L-type engine such as on the line 6—6 of FIG. 5, showing the intake valve in communication with the secondary chamber.

Referring to FIGS. 5 and 6, the L-type engine has a block 59, a cylinder 51 in the block 59, a piston 52 in the cylinder 51, a recess 53 in the block 59 leading to the cylinder 51 above the piston 52, an intake valve 54 and an exhaust valve 55 in the recess 53, a head 56 on the block 59, and a spark plug 57 in the head 56 leading to the cylinder 51 above the piston 52. The secondary combustion chamber apparatus 60 comprises a wall 61 overlying the cylinder 51 and piston 52. The wall 61 has an extending portion 62 in the recess 53 at the intake valve 54 and an aperture 63 at the intake valve 54 through which the intake valve 54 emits fuel mixture above the wall 61. The wall 61 is relieved adjacent the exhaust valve 55 forming an opening 64 to provide communication between the cylinder 51 and the exhaust valve 55. An upstanding peripheral flange 65 on the wall 61 and extending portion 62 abutting the head 56 forms the secondary combustion chamber S between the head 56 and the wall 61. The cylinder below the wall 61 forms the primary combustion chamber P. Ports 45 in the wall provide communication between the primary chamber P and the secondary chamber S. During the exhaust cycle of the engine, the combustion products in the cylinder 51 are emitted through the opening 64 to the exhaust valve 55. On the intake cycle of the engine, the intake valve 54 emits fresh fuel mixture directly into the secondary chamber S and directly through the secondary chamber S and the ports 45 into the primary chamber P.

Figure 7:
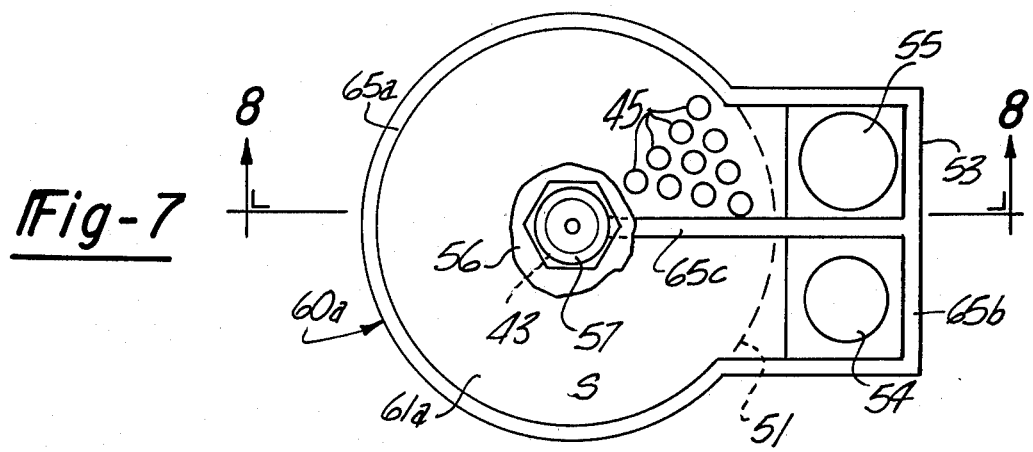
FIG. 7 is a top plan view of a modified apparatus similar to FIG. 5, showing ports clustered at the exhaust valve to provide exhaust communication from the primary chamber.

The modification 60A, FIG. 7, comprises a wall 61A overlying the cylinder 51 and extending into the recess 53 short of the valves 54 and 55. An upstanding arcuate peripheral flange 65A is formed on the wall 61A except in the location of the recess 53 of the block 59. The arcuate flange 65A has a rectangular extension 65B in the recess 53. A divider flange 65C extends from the flange 65B to the spark plug aperture 43 separating the valves 54 and 55 from one another in their immediate vicinity. Clustered ports 45 in the wall 61A provide communication between the primary chamber P and the secondary chamber S. On the exhaust cycle, combustion products in the secondary chamber S are directly vented through the exhaust valve 55 and combustion products in the primary chamber P are vented through the ports 45 and the secondary chamber S to the exhaust valve 55. The operation of the apparatus of FIGS. 5–7 is similar to that previously described relative to FIGS. 1 and 2.

Figure 8:
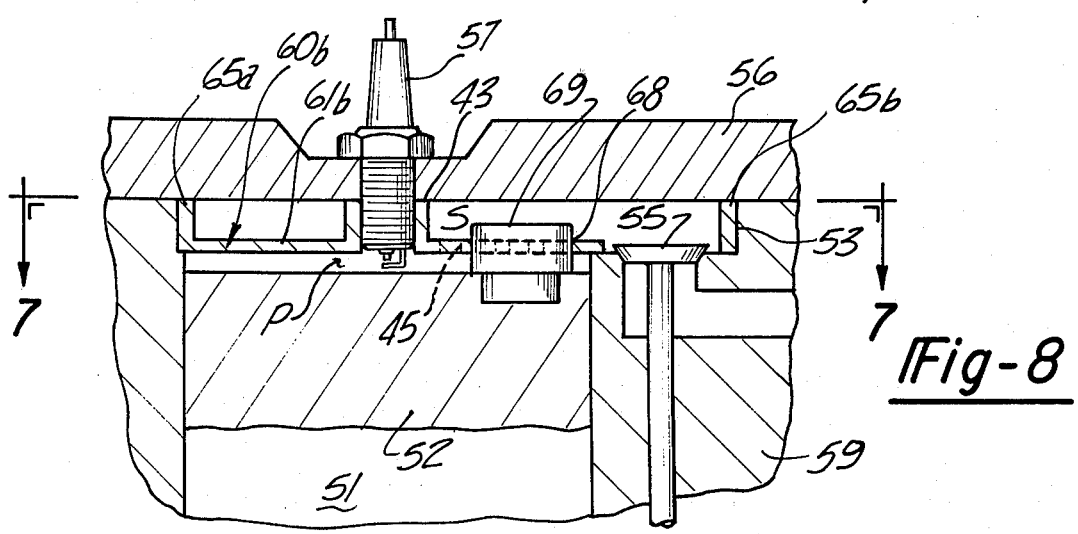
FIG. 8 is a vertical cross-sectional view of a modification of the apparatus seen in FIG. 7, such as on the line 8—8, showing a relatively large port in the apparatus at the exhaust valve to provide exhaust communication for the primary chamber and a chamber valve carried by the piston for occluding the port adjacent the top of the stroke of the piston.

The modification 60B, FIG. 8, comprises a wall 61B similar to the walls 61 and 61A, and includes a relatively large valve port 68 and a chamber valve 69 on the piston 52 for opening and closing the valve port 68. In the operation of the modifications of FIGS. 3, 4, and 8, chamber ports 48 and 68 and chamber valves 49 and 69, respectively, provide communication between the primary and secondary chambers during the engine cycles except when the chamber valves 49 and 69 close the chamber ports 48 and 68, respectively, adjacent and at the top position of the piston 22 in the cylinder 21.

The chamber valve modifications provide the advantage of mechanically timing and coordinating the dwell of the chamber valve in the chamber port to desired piston positions and crank conditions and provide the advantage of mechanically opening the chamber port at desired piston positions and crank conditions to provide ignition to the secondary chamber at desired reciprocating and angular positions.

In the operation of a four-cycle engine equipped with the novel apparatus and secondary combustion system, upon the exhaust stroke of the engine, the products of previous combustion are eliminated from the chambers as stated, leaving residues in both chambers. Upon the suction stroke, the fresh fuel is supplied through the secondary chamber and the chamber port or ports to the primary chamber thereby scavenging the secondary chamber of combustion residuals into the primary chamber together with fresh fuel mixture. This results in a richer fuel mixture in the secondary chamber than in the primary chamber. Upon the compression stroke, the fuel mixture in the primary chamber is directly compressed by the piston and the fuel mixture in the secondary chamber is indirectly compressed through the chamber port or ports. Upon the power stroke, first the fuel mixture in the primary chamber is directly ignited by the spark plug and second the fuel mixture in the secondary chamber is subsequently ignited by the burning of the fuel mixture in the primary chamber communicating ignition to the secondary chamber through the communicating chamber port or ports. The cycles then sequentially repeat. In the chamber valve embodiment, the second ignition in the secondary chamber is mechanically delayed and coordinated to a desired crank angle and piston position.

The protective scope of the invention is defined in the appended claims.

I claim:

1. Apparatus providing two-stage burning of fuel mixture in an internal combustion engine having a block; said block having a cylinder formed therein having an annular wall, a top, and a bottom; a head on said block sealing said cylinder at its said top, a reciprocating piston in said cylinder sealing said cylinder at its said bottom; said cylinder between said block and said reciprocating piston constituting a combustion chamber; a crank connected to said piston reciprocating said piston in said combustion chamber whereby said combustion chamber cubic volume is maximum at crank bottom dead-center position, minimum at crank top dead-center position of least mechanical advantage, and between maximum and minimum at other positions of said crank;

an intake valve in said engine leading to said combustion chamber for supplying fuel mixture to said combustion chamber, a spark plug leading to said combustion chamber for igniting the fuel mixture therein adjacent crank top dead-center position of minimum cubic capacity of said combustion chamber and least mechanical advantage;

an exhaust valve in said engine leading from said combustion chamber for venting combustion products of prior fuel burning from said combustion chamber;

said apparatus comprising a wall lying across said cylinder spaced from said head and spaced from said reciprocating piston at crank top dead center position;

said wall dividing said combustion chamber into a secondary combustion chamber between said wall and said head and a primary combustion chamber between said wall and said piston;

means spacing and supporting said wall;

said intake valve leading to said secondary chamber and said spark plug lying in said primary chamber;

at least one port in said wall communicating between said secondary and primary chambers;

fuel mixture directly supplied to said secondary chamber by said intake valve being supplied to said primary chamber from said secondary chamber through said port on the suction stroke of said piston, ignition of the fuel mixture in said primary chamber by said spark plug initiating burning of the fuel mixture in said primary chamber as said piston moves into its power stroke off crank top dead-center position with ensuing burning producing expanding gasses and increased pressure to drive said piston toward crank right angle position of greatest mechanical advantage, said ensuing burning in said primary chamber igniting the fuel mixture in said secondary chamber via said communicating port to burn the fuel mixture in said secondary chamber; said igniting of said fuel mixture in said secondary chamber thereby being subsequent to the ignition of said fuel mixture in said primary chamber;

the subsequent ensuing burning of the fuel mixture in said secondary chamber producing expanding gasses and increased pressure communicated to said primary chamber in flaming gasses via said port to augment the pressure in said primary chamber as said piston approaches, lies at, and moves past crank right angle position of greatest mechanical advantage;

said fuel mixture in said primary chamber being partially burned, turbulant, and mixed with burned fuel products which impede further efficient burning of the unburned portion of the fuel mixture in said primary chamber as said piston moves toward a condition of said crank at right angles;

said flaming gasses emitting from said secondary chamber into said primary chamber via said port also stimulating the burning of the yet unburned portions of the fuel mixture in said primary chamber to augment more complete burning of the fuel mixture in said primary chamber adjacent prior to, at, and adjacent after crank right angle condition to extract maximum burning and expansion of gasses for maximum conversion of the resultant pressure to mechanical motion;

said intake valve upon resupplying fuel mixture to said secondary combustion chamber after previous combustion, scavenging said secondary chamber of previous combustion products into said primary chamber to provide said secondary chamber with a richer fuel mixture than said primary chamber upon the next power stroke of said piston.

2. In an apparatus as set forth in claim 1, said exhaust valve communicating with said secondary chamber and said port providing an exit to said exhaust valve from said primary chamber for combustion products.

3. In an apparatus as set forth in claim 1, a chamber valve carried by said piston extending above said piston toward said wall a sufficient distance to enter and occlude said port in said wall to block communication between said chambers and to move out of said port to open said port to allow communication between said chambers;

said chamber valve lying in said port when said piston is adjacent and at its uppermost position of crank top dead-center condition to mechanically prevent ignition of the fuel mixture in said secondary chamber;

said chamber valve moving out of said port when said piston is at a position not adjacent crank top dead-center condition and moving toward crank right angle condition to permit ignition of the fuel mixture in said secondary chamber via said port.

4. In an apparatus as set forth in claim 1, said wall having a relief adjacent said exhaust valve to provide a channel from said primary chamber to said exhaust valve, and means at said relief separating said chambers from one another limiting communication of said intake valve to said secondary chamber and communication of said exhaust valve to said primary chamber.

5. In an apparatus as set forth in claim 1, said exhaust valve communicating with said secondary chamber; and a plurality of said ports in said wall adjacent said exhaust valve providing a channel to said exhaust valve for combustion products in said primary chamber; said intake valve when introducing fresh fuel mixture to said secondary chamber scavenging said secondary chamber through said ports of the products of previous combustion to provide a richer fuel mixture in said secondary chamber.

6. In an apparatus as set forth in claim 1, said intake and exhaust valves both communicating with said secondary chamber, and a flange on said wall extending to said secondary chamber against said head blocking communication between said valves in their location providing a channel at each said valve relative to said port in said wall.

7. In an apparatus as set forth in claim 6, a relatively large port in said wall in said channel at said exhaust valve for venting combustion products to said exhaust valve adjacent said exhaust valve;

said port lying remote to said intake valve to channel fresh fuel mixture through said channels to said port to scavenge said secondary chamber into said primary chamber.

8. In an apparatus as set forth in claim 7, a chamber valve on said piston for lying in said port at and adjacent the top position of said piston to mechanically block ignition from said primary chamber to said secondary chamber until said piston moves away from said positions.

9. In a device as set forth in claim 6, a plurality of relatively small ports in said wall adjacent said exhaust valve for venting combustion products to said exhaust valve adjacent said exhaust valve;

said ports lying remote to said intake valve to channel fresh fuel mixture through said channels to said ports to scavenge said secondary chamber into said primary chamber.

10. In a device as set forth in claim 1, said port being relatively small; said wall also having a relatively large port; and a chamber valve on said piston for occluding said large port adjacent the top position of said piston in its reciprocation in said cylinder.

* * * * *